United States Patent
Okaniwa et al.

(10) Patent No.: US 7,449,532 B2
(45) Date of Patent: Nov. 11, 2008

(54) CYCLOOLEFIN COPOLYMER OBTAINED BY RING-OPENING POLYMERIZATION, USE THEREOF, AND PROCESS FOR PRODUCING RETARDATION PLATE COMPRISING THE COPOLYMER

(75) Inventors: Motoki Okaniwa, Chuo-ku (JP); Ichiro Kajiwara, Chuo-ku (JP); Yoshimi Suwa, Chuo-ku (JP); Yoichiro Maruyama, Chuo-ku (JP); Yuichi Hashiguchi, Chuo-ku (JP)

(73) Assignee: JSR Corporation, Tokyo (JP)

( * ) Notice: Subject to any disclaimer, the term of this patent is extended or adjusted under 35 U.S.C. 154(b) by 97 days.

(21) Appl. No.: 11/587,050

(22) PCT Filed: Apr. 20, 2005

(86) PCT No.: PCT/JP2005/007515

§ 371 (c)(1),
(2), (4) Date: Oct. 20, 2006

(87) PCT Pub. No.: WO2005/103108

PCT Pub. Date: Nov. 3, 2005

(65) Prior Publication Data

US 2007/0179264 A1    Aug. 2, 2007

(30) Foreign Application Priority Data

Apr. 20, 2004    (JP) .............................. 2004-124170

(51) Int. Cl.
*C08G 61/08*    (2006.01)
*C08F 8/04*    (2006.01)
*G02B 1/04*    (2006.01)

(52) U.S. Cl. ..................... 526/283; 526/87; 526/281; 525/332.1; 525/338; 528/502 B; 359/240

(58) Field of Classification Search .................. 526/87, 526/281, 283; 525/332.1, 338; 528/502 B; 349/240
See application file for complete search history.

(56) References Cited

U.S. PATENT DOCUMENTS 6,552,145 B1 *    4/2003    Okada et al. ................ 526/281

(Continued)

FOREIGN PATENT DOCUMENTS

CA    2463644    *    7/2003

(Continued)

*Primary Examiner*—Fred M Teskin
(74) *Attorney, Agent, or Firm*—Oblon, Spivak, McClelland, Maier & Neustadt, P.C.

(57) ABSTRACT

A cycloolefin copolymer obtained by ring opening polymerization according to the present invention is characterized by comprising a specific structural unit and exhibiting a single peak in a derivative differential scanning calorimetry curve obtained by differential scanning calorimeter (DSC), having a temperature width of the rising part in the peak of 35° C. or below, and having a glass transition temperature (Tg) of 110° C. or above. The cycloolefin copolymer provided by the present invention has excellent heat resistance and optical properties, is suitable for the formation of a film or sheet therefrom, and can be stretched even at a relatively low temperature around the Tg without causing troubles such as cloudiness. A film or sheet comprising the cycloolefin copolymer, which has excellent optical properties and heat resistance and is also suitable for stretching even at a relatively low temperature, is also provided. Further, there are also provided a retardation plate having excellent optical properties and heat resistance and having uniform retardation, and a process for producing the retardation plate.

8 Claims, 4 Drawing Sheets

U.S. PATENT DOCUMENTS 7,037,993 B2 * 5/2006 Taguchi et al. ............... 526/281

FOREIGN PATENT DOCUMENTS

| | | | |
|---|---|---|---|
| JP | 2001 187815 | 7/2001 | |
| JP | 2003 255102 | 9/2003 | |
| WO | WO 03/085025 | * 10/2003 | |

* cited by examiner

US 7,449,532 B2

CYCLOOLEFIN COPOLYMER OBTAINED BY RING-OPENING POLYMERIZATION, USE THEREOF, AND PROCESS FOR PRODUCING RETARDATION PLATE COMPRISING THE COPOLYMER

TECHNICAL FIELD

The present invention relates to a cycloolefin copolymer obtained by ring opening polymerization that can be stretched at a relatively low temperature without posing problems of cloudiness and the like. The present invention also relates to a film, a sheet and a retardation plate comprising the above cycloolefin copolymer obtained by ring opening polymerization, and a process for producing the retardation plate.

BACKGROUND ART

Cycloolefin (co)polymers obtained by ring opening polymerization have features such as a high glass transition temperature due to the rigidity of the main chain structure, non-crystalline properties and high light transmittance due to the presence of a bulky group in the main chain structure, and low birefringence due to low anisotropy of the refraction and, by virtue of these features, have drawn attention as transparent thermoplastic resins possessing excellent heat resistance, transparency, and optical properties. Such cycloolefin (co)polymers obtained by ring opening polymerization are described, for example, in patent documents 1 to 6.

In recent years, the application of cycloolefin (co)polymers obtained by ring opening polymerization, for example, in the field of optical materials such as optical disks, optical lenses, and optical fibers, and sealing materials such as photosemiconductor sealing by taking advantage of the above features has been studied. Further, an attempt has also been made to apply the cycloolefin (co)polymer obtained by ring opening polymerization to films or sheets (films and sheets being hereinafter collectively referred to as "films") for reducing the problems of the conventional optical films.

That is, films such as polycarbonate, polyester, or triacetyl acetate films, which have hitherto been used as optical films, have a problem of development of or a change in a phase difference upon a very small stress change due to the high coefficient of photoelasticity and a problem of heat resistance or hygroscopic deformation. In order to solve these problems, films comprising a cycloolefin (co)polymer obtained by ring opening polymerization have been proposed as various films for optical applications. For example, patent documents 7 to 10 describe retardation plates (an optical film having the function of imparting a phase difference to transmitted light; also known as a retardation film) comprising a film of a cycloolefin (co)polymer obtained by ring opening polymerization. Further, patent documents 11 to 13 describe the use of a film of a cycloolefin (co)polymer obtained by ring opening polymerization in protective films of polarizing plates. Further, patent document 14 describes a substrate for a liquid crystal display element formed of a film of a cycloolefin (co)polymer obtained by ring opening polymerization.

In recent years, an increase in size and an enhancement in function of liquid crystal display devices (LCDs) have led to a higher level of demands for retardation plates for use in LCDs. For example, for an increase in screen size and a reduction in weight of LCDs, evenness of the phase difference and freedom from blurring of optical axis have been demanded on a higher level. Further, for an improvement in viewing angle of LCDs, for example, the control of a phase difference in the thickness-wise direction has become required In order to meet these demands, homopolymers and copolymers obtained by ring opening polymerization of various cycloolefin monomers have been proposed as materials for retardation plates.

In the case of the homopolymers, however, the properties of the polymers obtained are disadvantageously determined unambiguously by the properties of the cycloolefin monomer used, and, hence, there is a limitation on meeting all the property requirements.

On the other hand, in the case of copolymers, stretching at a temperature around the glass transition temperature (hereinafter referred to also as "Tg") of the copolymer sometimes causes serious problems such as cloudiness of the stretched film or a deterioration in uniformity of the phase difference. These problems can of course be avoided by carrying out stretching at an enhanced film stretching temperature. Stretching at an elevated temperature, however, lowers the developability of the phase difference and thus poses problems with the control of phase difference values, for example, an enhanced stretch ratio necessary for providing a desired phase difference value or the necessity of increasing the film thickness.

Accordingly, resins have been strongly desired which have excellent properties inherent in cycloolefin resins such as excellent heat resistance and transparency, do not pose any problem of cloudiness or the like upon film forming or film stretching at a relatively low temperature, for example, around Tg, and are suitable for applications of retardation plates and the like.

Under the above circumstances, the present inventors have made extensive and intensive studies and consequently have found that cycloolefin copolymers obtained by ring-opening polymerization, which have a specific structural unit, exhibit a single peak in a derivative differential scanning calorimetry curve obtained by differential scanning calorimeter (DSC), have a temperature width (hereinafter referred to as "Tg distribution") of the rising part in the peak of 35° C. or below, and have a glass transition temperature of 110° C. or above, do not pose any problem of cloudiness or the like even upon stretching at a temperature around Tg and are suitable for applications of films or sheets and retardation plates. This has led to the completion of the present invention.

[Patent document 1] Japanese Patent Laid-Open No. 132625/1989

[Patent document 2] Japanese Patent Laid-Open No. 132626/1989

[Patent document 3] Japanese Patent Laid-Open No. 218726/1988

[Patent document 4] Japanese Patent Laid-Open No. 133413/1990

[Patent document 5] Japanese Patent Laid-Open No. 120816/1986

[Patent document 6] Japanese Patent Laid-Open No. 115912/1986

[Patent document 7] Japanese Patent Laid-Open No. 245202/1992

[Patent document 8] Japanese Patent Laid-Open No. 36120/1992

[Patent document 9] Japanese Patent Laid-Open No. 2108/1993

[Patent document 10] Japanese Patent Laid-Open No. 64865/1993

[Patent document 11] Japanese Patent Laid-Open No. 212828/1993

[Patent document 12] Japanese Patent Laid-Open No. 51117/1994

[Patent document 13] Japanese Patent Laid-Open No. 77608/1995

[Patent document 14] Japanese Patent Laid-Open No. 61026/1993

DISCLOSURE OF THE INVENTION

Problems to be Solved by the Invention

An object of the present invention is to provide a cycloolefin copolymer obtained by ring opening polymerization that can meet high level of property requirements as retardation plates, do not pose any problem of cloudiness and the like even upon stretching at a temperature around the glass transition temperature (Tg), is suitable for applications of films or sheets having a uniform phase difference and free form blurring of optical axis, and can easily provide a retardation plate having a desired phase difference. Another object of the present invention is to provide a film or sheet comprising the cycloolefin copolymer obtained by ring-opening polymerization, a retardation plate comprising the film or sheet, and a process for producing the retardation plate.

Means for Solving the Problems

According to the present invention, there is provided a cycloolefin copolymer obtained by ring opening polymerization, characterized by comprising a structural unit represented by general formula (1) and exhibiting a single peak in a derivative differential scanning calorimetry curve obtained by differential scanning calorimeter (DSC), having a temperature width of the rising part in the peak of 35° C. or below, and having a glass transition temperature (Tg) of 110° C. or above.

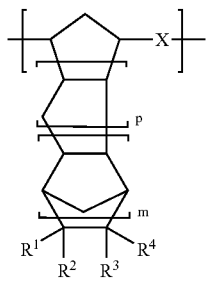

(1)

wherein m is 0 (zero), 1 or 2, p is 0 (zero) or 1, X independently represents a group represented by formula: —CH=CH— or a group represented by formula: —CH$_2$CH$_2$—, R$^1$ to R$^4$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group, and R$^1$ and R$^2$, or R$^3$ and R$^4$ together may combine to form a mono- or polycyclic carbocyclic or heterocyclic ring.

The cycloolefin copolymer obtained by ring opening polymerization according to the present invention preferably comprises two or more structural units represented by general formula (1) and more preferably does not have any structural unit other than the structural unit represented by general formula (1).

The cycloolefin copolymer obtained by ring opening polymerization according to the present invention is particularly preferably a copolymer of 8-methyl-8-methoxycarbonyltetracyclo-[4.4.0.1$^{2,5}$.1$^{7,10}$]-3-dodecene with tricyclo[4.3.0.1$^{2,5}$]deca-3,7-diene.

According to the present invention, there is provided a film or sheet characterized by comprising the cycloolefin copolymer obtained by ring-opening polymerization according to the present invention.

Further, according to the present invention, there is provided a retardation plate characterized by comprising the film or sheet according to the present invention which has been subjected to stretch orientation.

According to the present invention, there is also provided a process for producing a retardation plate, characterized by comprising subjecting the film or sheet according to the present invention to stretch orientation under temperature conditions of Tg of the cycloolefin copolymer contained in the film or sheet to (Tg+10)° C.

Effect of the Invention

The present invention can provide a cycloolefin copolymer that has excellent heat resistance and optical properties, is suitable for the formation of a film or sheet therefrom, and can be stretched even at a relatively low temperature around the Tg without causing troubles such as cloudiness. The present invention can also provide a film or sheet comprising the cycloolefin copolymer that has excellent optical properties and heat resistance and is also suitable for stretching even at a relatively low temperature. Further, the present invention can provide a retardation plate having excellent optical properties and heat resistance, having an even phase difference, and free from blurring of optical axis, and a process for producing the retardation plate.

BEST MODE FOR CARRYING OUT THE INVENTION

Figure 1:
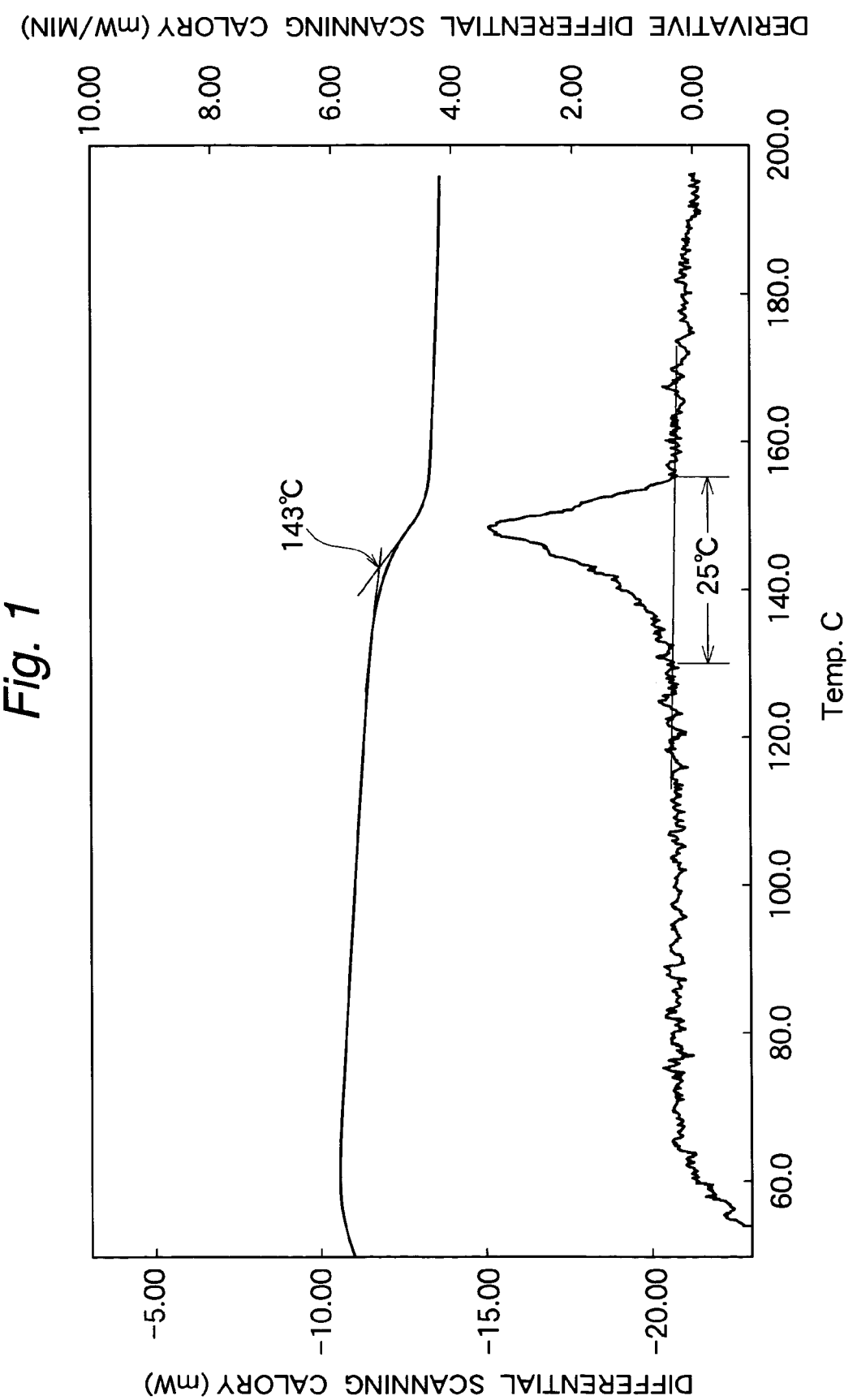
FIG. 1 is a DSC measurement chart of copolymer (1) produced in Example 1.

The present invention will be described in more detail.

<Cycloolefin Copolymer>

The cycloolefin copolymer according to the present invention comprises a structural unit represented by general formula (1):

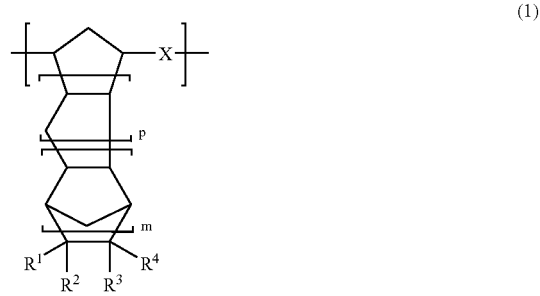

(1)

wherein m is 0 (zero), 1 or 2, p is 0 (zero) or 1, X independently represents a group represented by formula:

—CH═CH— or a group represented by formula: —CH$_2$CH$_2$—, R$^1$ to R$^4$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group, and R$^1$ and R$^2$, or R$^3$ and R$^4$ together may combine to form a mono- or polycyclic carbocyclic or heterocyclic ring.

The structural unit represented by general formula (1) is derived from a cycloolefin monomer represented by general formula (2) (hereinafter referred to as "specific monomer (1)") by ring opening copolymerization:

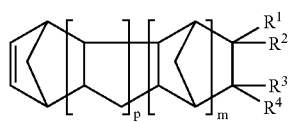

(2)

wherein m, p and R$^1$ to R$^4$ are as defined in general formula (1).

The structural unit represented by general formula (1) may also be produced by subjecting a dicyclopentadiene (DCP) monomer represented by general formula (3) to ring opening copolymerization and then hydrogenating the five-membered ring.

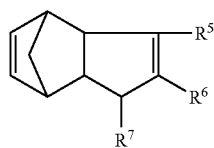

(3)

wherein R$^5$ to R$^7$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group.

As described above, in general formulae (1) to (3), R$^1$ to R$^7$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group. These atoms and groups will be described.

Halogen atoms include fluorine, chlorine, and bromine atoms.

Hydrocarbon groups having 1 to 30 carbon atoms include, for example, alkyl groups such as methyl, ethyl, and propyl groups; cycloalkyl groups such as cyclopentyl and cyclohexyl groups; and alkenyl groups such as vinyl, allyl, and propenyl groups.

The substituted or unsubstituted hydrocarbon group may be bonded to the ring structure either directly or through a linkage. Linkages include, for example, divalent hydrocarbon groups having 1 to 10 carbon atoms, for example, an alkylene group represented by —(CH$_2$)$_m$— wherein m is an integer of 1 to 10; and oxygen-, nitrogen-, sulfur-, or silicon-containing linkages, for example, a carbonyl group (—CO—), an oxycarbonyl group (—O(CO)—), a sulfone group (—SO$_2$—), an ether bond (—O—), a thioether bond (—S—), an imino group (—NH—), an amide bond (—NHCO—, —CONH—), or a siloxane bond (—OSi(R$_2$)—) wherein R represents an alkyl group such as methyl or ethyl. The linkage may contain a plurality of groups or bonds.

Polar groups include, for example, hydroxyl, alkoxy having 1 to 10 carbon atoms, carbonyloxy, alkoxycarbonyl, aryloxycarbonyl, cyano, amide, imide, triorganosiloxy, triorganosilyl, amino, acyl, alkoxysilyl, sulfonyl, and carboxyl. More specifically, alkoxy groups include, for example, methoxy and ethoxy; carbonyloxy groups include, for example, alkylcarbonyloxy groups such as acetoxy and propionyloxy, and arylcarbonyloxy groups such as benzoyloxy; alkoxycarbonyl groups include, for example, methoxycarbonyl and ethoxycarbonyl; aryloxycarbonyl groups include, for example, phenoxycarbonyl, naphthyloxycarbonyl, fluorenyloxycarbonyl, and biphenylyloxycarbonyl; triorganosiloxy groups include, for example, trimethylsiloxy and triethylsiloxy; triorganosilyl groups include, for example, trimethylsilyl and triethylsilyl; amino groups include primary amino; and alkoxysilyl groups include, for example, trimethoxysilyl and triethoxysilyl.

Specific examples of specific monomers (1) usable in the present invention include bicyclo[2.2.1]hept-2-ene, 5-methyl-bicyclo[2.2.1]hept-2-ene, 5,5-dimethyl-bicyclo[2.2.1]hept-2-ene, 5,6-dimethyl-bicyclo[2.2.1]hept-2-ene, 5-ethyl-bicyclo[2.2.1]hept-2-ene, 5-cyclo-hexylbicyclo[2.2.1]hept-2-ene, 5-phenyl-bicyclo[2.2.1]hept-2-ene, 5-(2-naphthyl)-bicyclo[2.2.1]hept-2-ene, 5-vinyl-bicyclo[2.2.1]hept-2-ene, 5-methoxycarbonyl-bicyclo[2.2.1]hept-2-ene, 5-phenoxycarbonyl-bicyclo[2.2.1]hept-2-ene, 5-methoxycarbonylethyl-bicyclo[2.2.1]hept-2-ene, 5-methyl-5-methoxycarbonyl-bicyclo[2.2.1]hept-2-ene, 5-methyl-5-phenoxycarbonyl-bicyclo[2.2.1]hept-2-ene, 5-cyano-bicyclo[2.2.1]hept-2-ene, 5-fluoro-bicyclo[2.2.1]hept-2-ene, 5,5-difluoro-bicyclo[2.2.1]hept-2-ene, 5,6-difluoro-bicyclo[2.2.1]hept-2-ene, 5-chloro-bicyclo[2.2.1]hept-2-ene, 5,5-dichloro-bicyclo[2.2.1]hept-2-ene, 5,6-dichloro-bicyclo[2.2.1]hept-2-ene, tricyclo[4.3.0.1$^{2,5}$]deca-3-ene, 7-methyl-tricyclo[4.3.0.1$^{2,5}$]deca-3-ene, 8-methyl-tricyclo[4.3.0.1$^{2,5}$]deca-3-ene, 7-ethyl-tricyclo[4.3.0.1$^{2,5}$]deca-3-ene, 7-isopropyl-tricyclo[4.3.0.1$^{2,5}$]deca-3-ene, 7-cyclohexyl-tricyclo[4.3.0.1$^{2,5}$]deca-3-ene, 7-phenyl-tricyclo[4.3.0.1$^{2,5}$]deca-3-ene, 7,7-dimethyl-tricyclo[4.3.0.1$^{2,5}$]deca-3-ene, 7,8-dimethyl-tricyclo[4.3.0.1$^{2,5}$]deca-3-ene, 7-methyl-8-ethyl-tricyclo[4.3.0.1$^{2,5}$]deca-3-ene, 7-methoxycarbonyl-tricyclo[4.3.0.1$^{2,5}$]deca-3-ene, 8-methoxycarbonyl-tricyclo[4.3.0.1$^{2,5}$]deca-3-ene, 7-phenoxycarbonyl-tricyclo[4.3.0.1$^{2,5}$]deca-3-ene, 7-methyl-7-methoxycarbonyl-tricyclo[4.3.0.1$^{2,5}$]deca-3-ene, 8-methyl-8-methoxycarbonyl-tricyclo[4.3.0.1$^{2,5}$]deca-3-ene, 7-fluoro-tricyclo[4.3.0.1$^{2,5}$]deca-3-ene, 8-fluoro-tricyclo[4.3.0.1$^{2,5}$]deca-3-ene, 7-chloro-tricyclo[4.3.0.1$^{2,5}$]deca-3-ene, 8-chloro-tricyclo[4.3.0.1$^{2,5}$]deca-3-ene, 7,7-difluoro-tricyclo[4.3.0.1$^{2,5}$]deca-3-ene, 7,8-difluoro-tricyclo[4.3.0.1$^{2,5}$]deca-3-ene, 7,8-dichloro-tricyclo[4.3.0.1$^{2,5}$]deca-3-ene, tetracyclo[4.4.0.1$^{2,5}$.1$^{7,10}$]dodeca-3-ene, 8-methyl-tetracyclo[4.4.0.1$^{2,5}$.1$^{7,10}$]dodeca-3-ene, 8-ethyl-tetracyclo[4.4.0.1$^{2,5}$.1$^{7,10}$]dodeca-3-ene, 8-phenyl-tetracyclo[4.4.0.1$^{2,5}$.1$^{7,10}$]dodeca-3-ene, 8-methoxycarbonyl-tetracyclo[4.4.0.1$^{2,5}$.1$^{7,10}$]dodeca-3-ene, 8-ethoxycarbonyl-tetracyclo[4.4.0.1$^{2,5}$.1$^{7,10}$]dodeca-3-ene, 8-n-propoxycarbonyl-tetracyclo[4.4.0.1$^{2,5}$.1$^{7,10}$]dodeca-3-ene, 8-isopropoxycarbonyl-tetracyclo[4.4.0.1$^{2,5}$.1$^{7,10}$]dodeca-3-ene, 8-n-butoxycarbonyl-tetracyclo[4.4.0.1$^{2,5}$.1$^{7,10}$]-dodeca-3-ene, 8-phenoxycarbonyl-tetracyclo[4.4.0.1$^{2,5}$.1$^{7,10}$]dodeca-3-ene, 8-methyl-8-methoxycarbonyl-tetracyclo[4.4.0.1$^{2,5}$.1$^{7,10}$]-dodeca-3-ene, 8-methyl-8-ethoxycarbonyl-tetracyclo[4.4.0.1$^{2,5}$.1$^{7,10}$]-dodeca-3-ene, 8-methyl-8-n-propoxycarbonyl-tetracyclo[4.4.0.1$^{2,5}$.1$^{7,10}$]-dodeca-3-ene, 8-methyl-8-isopropoxycarbonyl-tetracyclo[4.4.0.1$^{2,5}$.1$^{7,10}$]-dodeca-3-ene, 8-methyl-8-n-butoxycarbonyl-tetracyclo[4.4.0.1$^{2,5}$.1$^{7,10}$]-dodeca-3-ene, 8-methyl-8-phenoxycarbonyl-tetracyclo[4.4.0.1$^{2,5}$.1$^{7,10}$]-dodeca-3-ene, 8-methyl-8-phenyl-tetracyclo[4.4.0.1$^{2,5}$.1$^{7,10}$]dodeca-3-ene, 8-fluoro-tetracyclo[4.4.0.1$^{2,5}$.1$^{7,10}$]dodeca-3-ene, 8,8-difluoro-tetracyclo[4.4.0.1$^{2,5}$.1$^{7,10}$]dodeca-3-ene, 8,9-difluoro-tetracyclo[4.4.0.1$^{2,5}$.1$^{7,10}$]dodeca-3-ene, 8-chloro-tetracyclo[4.4.0.1$^{2,5}$.1$^{7,10}$]dodeca-3-ene, 8,8-dichloro-tetracyclo[4.4.0.1$^{2,5}$.1$^{7,10}$]dodeca-3-ene, 8,9-dichloro-tetracyclo[4.4.0.1$^{2,5}$.1$^{7,10}$]dodeca-3-ene, 8-fluoromethyl-tetracyclo[4.4.0.1$^{2,5}$.1$^{7,10}$]dodeca-3-ene, 8-difluoromethyl-tetracyclo[4.4.0.1$^{2,5}$.1$^{7,10}$]dodeca-3-ene, 8-trifluoromethyl-tetracyclo[4.4.0.1$^{2,5}$.1$^{7,10}$]dodeca-3-ene, 8,8-bis(trifluoromethyl)-tetracyclo[4.4.0.1$^{2,5}$.1$^{7,10}$]dodeca-3-ene, 8,9-bis(trifluoromethyl)-tetracyclo[4.4.0.1$^{2,5}$.1$^{7,10}$]dodeca-3-ene, 8-methyl-8-trifluoromethyltetracyclo[4.4.0.1$^{2,5}$.1$^{7,10}$]dodeca-3-ene, and pentacyclo[7.4.0.1$^{2,5}$.1$^{9,12}$.0$^{8,13}$]-3-pentadecene. In the present invention, however, specific monomers are not limited to these examples only.

Among these specific monomers (1), specific monomers (1) in which at least one of $R^1$ to $R^4$ in general formula (2) represents a specific polar group represented by general formula (4) are preferred from the viewpoint of balance between the heat resistance and the moisture (water) resistance of the resultant copolymer obtained by ring opening polymerization.

$$-(CH_2)_n COOR^8 \qquad (4)$$

wherein n is generally 0 (zero) or an integer of 1 to 5; and $R^8$ represents a hydrocarbon group having 1 to 15 carbon atoms.

In general formula (4), when then value is smaller and when the number of carbons in $R^8$ is smaller, preferably, the glass transition temperature of the resultant copolymer becomes higher and the heat resistance is improved. That is, n is generally 0 (zero) or an integer of 1 to 5, preferably 0 (zero) or 1, and $R^8$ generally represents a hydrocarbon group having 1 to 15 carbon atoms, preferably an alkyl group having 1 to 3 carbon atoms.

Further, from the viewpoint of the balance between the heat resistance and the water (moisture) absorption of the resultant copolymer, preferably, in general formula (2), an alkyl group is further bonded to the carbon atom to which the polar group represented by general formula (4) is bonded. The number of carbons in the alkyl group is preferably 1 to 5, more preferably 1 to 2, particularly preferably 1.

Specific examples of DCP monomers represented by general formula (3) used in the present invention include tricyclo[4.3.0.1$^{2,5}$]deca-3,7-diene (DCP), 7-methyl-tricyclo[4.3.0.1$^{2,5}$]deca-3,7-diene, 8-methyl-tricyclo[4.3.0.1$^{2,5}$]deca-3,7-diene, 9-methyl-tricyclo[4.3.0.1$^{2,5}$]deca-3,7-diene, 7,8-dimethyl-tricyclo[4.3.0.1$^{2,5}$]deca-3,7-diene, 7-ethyl-tricyclo[4.3.0.1$^{2,5}$]deca-3,7-diene, 7-cyclohexyl-tricyclo[4.3.0.1$^{2,5}$]deca-3,7-diene, 7-phenyl-tricyclo[4.3.0.1$^{2,5}$]deca-3,7-diene, 7-(4-biphenyl)-tricyclo[4.3.0.1$^{2,5}$]deca-3,7-diene, 7-methoxycarbonyl-tricyclo[4.3.0.1$^{2,5}$]deca-3,7-diene, 7-phenoxycarbonyl-tricyclo[4.3.0.1$^{2,5}$]deca-3,7-diene, 7-methyl-7-methoxycarbonyl-tricyclo[4.3.0.1$^{2,5}$]deca-3,7-diene, 7-fluoro-tricyclo[4.3.0.1$^{2,5}$]deca-3,7-diene, 7,8-difluoro-tricyclo[4.3.0.1$^{2,5}$]deca-3,7-diene, and 7-chloro-tricyclo[4.3.0.1$^{2,5}$]deca-3,7-diene. The DCP monomer, however, is not limited to these examples only.

The cycloolefin copolymer obtained by ring opening polymerization according to the present invention exhibits a single peak in a derivative differential scanning calorimetry curve obtained by differential scanning calorimeter (DSC), has a narrow Tg distribution as a rising temperature width in the peak of 35° C. or below, and, at the same time, has a glass transition temperature (Tg) of 110° C. or above and possesses excellent heat resistance. The derivative differential scanning calorimetry curve measured by DSC used in the present invention is obtained by measurement at a temperature rise rate of 20° C./min in a nitrogen atmosphere. The rising temperature width of the peak is the width between inflection points at which the peak rises from the baseline. Further, the Tg value of the cycloolefin copolymer obtained by ring opening polymerization is determined by plotting the highest peak temperature (point A) of derivative differential scanning calorie and the temperature which is 20° C. below the highest peak temperature (point B) on a differential scanning calorimetry curve and determining, as the Tg value, a point of intersection between a tangential line on a baseline with the point B as a starting point and a tangential line with the point A as a starting point.

In the present invention, two or more monomers selected from the specific monomers (1) and the DCP monomers represented by general formula (3) are subjected to ring opening copolymerization. In order to produce the cycloolefin copolymer having a Tg distribution of 35° C. or below by ring opening polymerization according to the present invention, polymerization conditions should be properly selected while taking the reactivity of the monomers into consideration.

In order to realize the contemplated narrow Tg distribution width, it is important that the difference in the composition ratio of the monomers in the polymerization system between the early stage of the polymerization and the later stage of the polymerization should not be significantly changed. For example, when two monomers of $M_1$ and $M_2$ are used, the width of a change in $d[M_1]/d[M_2]$ calculated by the Lewis-Mayo's equation represented by formula (A) is preferably regulated within 0.7, preferably within 0.6 during the polymerization.

$$\frac{d[M_1]}{d[M_2]} = \frac{[M_1]}{[M_2]} \cdot \frac{r_1[M_1]+[M_2]}{[M_1]+r_2[M_2]} \qquad \text{Formula (A)}$$

wherein $[M_1]$ represents the concentration of monomer $M_1$ within the reactor; $[M_2]$ represents the concentration of monomer $M_2$ within the reactor; and $r_1$ and $r_2$ each represent the coefficients of copolymerization reactivity of monomers $M_1$ and $M_2$.

Specifically, for example, when a batch-type reaction vessel is used, the monomer concentration changes with the elapse of time. Accordingly, in order that the width of a change in $d[M_1]/d[M_2]$ falls within a given value range, the charge ratio of monomers is set in accordance with the $r_1$ and $r_2$ values in formula (A). For example, when two monomers ($M_1$, $M_2$) respectively with $r_1$=1.7, $r_2$=0.9 are used and the polymerization is started at monomer charge ratio $M_1/M_2$=37/63 (molar ratio), the results are $d[M_1]/d[M_2]$=0.789 (early stage of polymerization: conversion=1%) and 0.336 (later stage of polymerization: conversion=95%). That is, the width of change is 0.453 which falls within the requirement range, and, thus, a narrow Tg distribution can be realized. On the other hand, when the monomer charge ratio is $M_1/M_2$=63.7/36.3(molar ratio), the results are $d[M_1]/d[M_2]$=2.636 (early stage of polymerization: conversion=1%) and 0.866 (later stage of polymerization: conversion=95%). The width of change is 1.771. The width of change is preferably not more than 1.1, particularly preferably not more than 0.84. In order that the width of change is not more than 1.1, the polymerization should be terminated in the course of the polymerization (conversion not more than 70%).

In order that a copolymer having a narrow Tg distribution is produced by ring opening polymerization by allowing the width of change in $d[M_1]/d[M_2]$ to fall within a given range, for example, any of the following methods may be applied: a method in which monomers having a $r_1/r_2$ ratio which is small and in a narrow range are selected, a method in which the polymerization is terminated in an early stage, or a method in which a monomer having a large r value is fed either dividedly or continuously into the polymerization system.

The reactivity of the monomer referred to herein can be measured, for example, by the Fineman-Ross method described, for example, in "Kobunshi Gosei Kagaku (Synthetic Chemistry of Polymers)" (Tokyo Denki University Press), supervised by Yuya Yamashita, P.65, or Eishun Tsuchida, "Kobunshi No Kagaku (Polymer Chemistry)" (BAIFUKAN CO., LTD.), p. 214.

The ring opening polymerization reaction of the monomer composition containing the specific monomer (1) and/or the DCP monomer can be carried out by a conventional method while paying attention to the reactivity of the above main and auxiliary monomers. The polymer produced by the ring opening polymerization of the monomer composition containing the specific monomer (1) and/or the DCP monomer per se has an olefinic unsaturated bond in its molecule and thus possesses a problem of thermal coloration and the like. Accordingly, preferably, the olefinic unsaturated bond is hydrogenated. This hydrogenation reaction may also be carried out by a conventional method.

The ring opening polymerization reaction and the hydrogenation reaction can be carried out by applying, for example, catalysts, solvents and temperature conditions described, for example, in Japanese Patent Laid-Open No. 218726/1988, Japanese Patent Laid-Open No. 132626/1989, Japanese Patent Laid-Open No. 240517/1989, and Japanese Patent Laid-Open No. 10221/1990.

The degree of hydrogenation of the olefinic unsaturated bond is generally not less than 80% by mole, preferably not less than 90% by mole, more preferably not less than 95% by mole. As described above, the hydrogenation reaction in the present invention is for the olefinic unsaturated bond in the molecule. When the cycloolefin copolymer obtained by ring opening polymerization according to the present invention contains an aromatic group, the aromatic group can sometimes advantageously act on optical properties such as refractive index and heat resistance and thus is not necessarily required to be hydrogenated.

In the present invention, the cycloolefin copolymer obtained by ring opening polymerization contains the structural unit represented by general formula (1) as an indispensable structural unit. Further, other structural unit(s) may also be contained so far as the effect of the present invention is not marred. Such structural units can be formed by ring opening copolymerization of, for example, a cycloolefin monomer such as cyclobutene, cyclopentene, cycloheptene, or cyclooctene with the specific monomer (1) and/or the DCP monomer. Further, such structural units can also be formed by ring opening polymerization of the specific monomer (1) and/or the DCP monomer, for example, in the presence of an unsaturated hydrocarbon polymer having an olefinic unsaturated bond in its main chain such as polybutadiene, polyisoprene, styrene-butadiene copolymer, ethylene-nonconjugated diene copolymer, or polynorbornene, and when the cycloolefin copolymer obtained by ring opening polymerization comprises the above structural units, the impact resistance of the copolymer according to the present invention is likely to be improved.

Regarding the molecular weight of the cycloolefin copolymer obtained by ring opening polymerization according to the present invention, the number average molecular weight (Mn) as measured by gel permeation chromatography (GPC) using polystyrene standard is generally 8000 to 1,000,000, preferably 10,000 to 500,000, more preferably 20,000 to 100,000, and the weight average molecular weight (Mw) as measured using polystyrene standard is generally 10,000 to 3,000,000, preferably 20,000 to 1,000,000, more preferably 30,000 to 500,000.

When the molecular weight is below the lower limit of the above-defined range, the strength of the resultant film is sometimes lowered. On the other hand, when the molecular weight is above the upper limit of, the above-defined range, the viscosity of the solution becomes excessively high and, consequently, the productivity or processability of the copolymer according to the present invention is sometimes deteriorated.

The molecular weight distribution (Mw/Mn) of the copolymer according to the present invention is generally 1.5 to 10, preferably 2 to 8, more preferably 2.2 to 5.

For the cycloolefin copolymer obtained by ring opening polymerization according to the present invention, the saturated water absorption at 23° C. is generally 0.01 to 1% by weight, preferably 0.05 to 0.7% by weight, more preferably 0.1 to 0.5% by weight. When the saturated water absorption of the copolymer according to the present invention is in the above-defined range, various optical properties, transparency, phase difference and phase difference uniformity, or dimensional accuracy of the formed film can be stably maintained even under high temperature and high humidity conditions. Further, in this case, the film has excellent adhesion and bonding properties to other materials. Therefore, peeling or the like does not occur during use, and, further, compatibility with additives such as antioxidants is also excellent, contributing to increased freedom in the type and amount of the additives.

When the saturated water absorption is less than 0.01% by weight, the adhesion and bonding properties of the formed film to other materials are so low that peeling is likely to occur during use, and, in some case, the amount of additives such as antioxidants added is limited. On the other hand, when the saturated water absorption exceeds 1% by weight, an optical property change and a dimensional change are likely to occur due to water absorption.

Here the saturated water absorption is a value determined according to ASTM D 570 by immersing the copolymer in water of 23° C. for one week and measuring the increased weight.

The glass transition temperature (Tg) of the cycloolefin copolymer obtained by ring opening polymerization according to the present invention is generally 110 to 250° C., preferably 115 to 220° C., more preferably 120 to 200° C. When the Tg value is below 110° C., the heat deformation temperature is lowered, often leading to a problem of heat resistance. Further, in some cases, a problem of an increase in the optical property change by the temperature in the formed film occurs. On the other hand, when the Tg value exceeds 250° C., the necessary processing temperature in stretching is so high that the copolymer according to the present invention is sometimes thermally deteriorated.

Conventional antioxidants and ultraviolet absorbers can be added to the cycloolefin copolymer obtained by ring opening polymerization according to the present invention for thermal deterioration resistance or light fastness improvement purposes so far as the effect of the present invention is not marred. For example, at least one compound selected from the group consisting of phenol compounds, thiol compounds, sulfide compounds, disulfide compounds, and phosphorus compounds can be added in an amount of 0.01 to 10 parts by weight based on 100 parts by weight of the copolymer according to the present invention from the viewpoint of improving the thermal deterioration resistance.

<Phenol Compounds>

Phenol compounds include triethylene glycol-bis[3-(3-t-butyl-5-methyl-4-hydroxyphenyl)-propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-3,5-triazine, pentaerythrithyl-tetrakis[3-(3,5-di-t-butyl-4-hydroxypheny 1)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N-hexamethylenebis(3,5-di-t-butyl-4-hydroxy-hydrocinnamamide), 1,3,5-trimethyl-2,4,6-tris(3,5-di-t-butyl-4-hydroxybenzyl) benzene, tris-(3,5-di-t-butyl-4-hydroxybenzyl)-isocyanurate, and 3,9-bis[2-[3-(3-t-butyl-4-hydroxy-5-methylphenyl)-propionyloxy]-1,1-dimethylethyl]-2,4,8,10-tetraoxaspiro[5,5]undecane. Preferred are octadecyl-3-(3,5-di-t-butyl-4-hydroxyphenyl)propionate, 1,3,5-trimethyl-2,4,6-tris(3,5-di-t-butyl-4-hydroxybenzyl) benzene, and pentaerythrithyl-tetrakis[3-(3,5-di-t-butyl-4-hydroxyphenyl)propionate]. Particularly preferred is octadecyl-3-(3,5-di-t-butyl-4-hydroxyphenyl)propionate.

<Thiol Compounds>

Thiol compounds include alkylmercaptans such as t-dodecylmercaptan and hexylmercaptan, 2-mercaptobenzimidazole, 2-mercapto-6-methylbenzimidazole, 1-methyl-2-(methylmercapto)benzimidazole, 2-mercapto-1-methylbenzimidazole, 2-mercapto-4-methylbenzimidazole, 2-mercapto-5-methylbenzimidazole, 2-mercapto-5,6-dimethylbenzimidazole, 2-(methylmercapto)benzimidazole, 1-methyl-2-(methylmercapto)benzimidazole, 2-mercapto-1,3-dimethylbenzimidazole, and mercaptoacetic acid.

<Sulfide Compounds>

Sulfide compounds include 2,2-thio-diethylenebis[3-(3,5-di-t-butyl-4-hydroxyphenyl)-propionate], 2,2-thiobis(4-methyl-6-t-butylphenol), 2,4-bis(n-octylthiomethyl)-6-methylphenol, dilauryl 3,3'-thiodipropionate, dimyristyl 3,3'-thiodipropionate, distearyl 3,3'-thiodipropionate, pentaerythrityl tetrakis(3-laurylthiopropionate), and ditridecyl 3,3'-thiodipropionate.

<Disulfide Compounds>

Disulfide compounds include bis(4-chlorophenyl)disulfide, bis(2-chlorophenyl)disulfide, bis(2,5-dichlorophenyl)disulfide, bis(2,4,6-trichlorophenyl)disulfide, bis(2-nitrophenyl)disulfide, ethyl 2,2'-dithiodibenzoate, bis(4-acetylphenyl)disulfide, bis(4-carbamoylphenyl)disulfide, 1,1'-dinaphthyl disulfide, 2,2'-dinaphthyl disulfide, 1,2'-dinaphthyl disulfide, 2,2'-bis(1-chlorodinaphthyl)disulfide, 1,1'-bis(2-chloronaphthyl)disulfide, 2,2'-bis(1-cyanonaphthyl)disulfide, 2,2'-bis(1-acetylnaphthyl)disulfide, and dilauryl 3,3'-thiodipropionate ester.

<Phosphorus Compound>

Phosphorus compounds include tris(4-methoxy-3,5-diphenyl)phosphite, tris(nonylphenyl)phosphite, tris(2,4-di-t-butylphenyl)phosphite, bis(2,6-di-t-butyl-4-methylphenyl) pentaerythritol diphosphite, and bis(2,4-di-t-butylphenyl) pentaerythritol diphosphite.

Further, lightfastness can be improved by adding 0.01 to 3 parts by weight, preferably 0.05 to 2 parts by weight, based on 100 parts by weight of the copolymer according to the present invention, of benzophenone compounds such as 2,4-dihydroxybenzophenone or 2-hydroxy-4-methoxybenzophenone, benzotriazole compounds such as N-(benzyloxycarbonyloxy)benzotriazole, or oxanilide compounds such as 2-ethyloxanilide or 2-ethyl-2'-ethoxyoxanilide.

The cycloolefin copolymer obtained by ring opening polymerization according to the present invention can be formed into a film by a conventional solvent casting method (can be formed into a film by a solvent casting method or a melt forming method. Thus, the film or sheet (the film and sheet being hereinafter collectively referred to as "film") according to the present invention can be obtained.

The solvent casting method is preferably carried out, for example, by dissolving or dispersing the copolymer resin according to the present invention in a solvent to prepare a film forming solution containing the copolymer according to the present invention in a suitable concentration, casting the film forming solution by pouring or coating this film forming solution onto a suitable carrier to form a liquid phase of the film forming solution on the carrier, then drying the liquid layer to remove the solvent, and separating the film from the carrier.

In the preparation of the film forming solution by the solvent casting method, the concentration of the copolymer according to the present invention is generally 0.1 to 70% by weight, preferably 1 to 50% by weight, more preferably 10 to 35% by weight. When this concentration is below the lower limit of the above-defined range, the formation of a film having a necessary thickness is difficult and, at the same time, foaming is likely to occur upon the evaporation of the solvent in the removal of the solvent by drying, often making it difficult to provide a film having good surface smoothness. On the other hand, when the concentration is above the upper limit of the above-defined range, the viscosity of the film forming solution is so high that, in some cases, it is difficult to form a film having uniform thickness and surface state.

The viscosity of the film forming solution at room temperature is generally 1 to 1,000,000 (mPa·s), preferably 10 to 100,000 (mPa·s), more preferably 100 to 80,000 (mPa·s), particularly preferably 1000 to 60,000 (mPa·s).

Solvents usable in the preparation of the film forming solution include aromatic solvents such as benzene, toluene, and xylene, cellosolve solvents such as methylcellosolve, ethylcellosolve, and 1-methoxy-2-propanol, ketone solvents such as diacetone alcohol, acetone, cyclohexanone, methyl ethyl ketone, 4-methyl-2-pentanone, cyclohexanone, ethylcyclohexanone, and 1,2-dimethylcyclohexane, ester solvents such as methyl lactate and ethyl lactate, halogen-containing solvents such as 2,2,3,3-tetrafluoro-1-propanol, methylene chloride, or chloroform, ether solvents such as tetrahydrofuran and dioxane, and alcohol solvents such as 1-pentanol and 1-butanol.

In addition to the above solvents, solvents having an SP value (solubility parameter) of generally 10 to 30 (MPa$^{1/2}$), preferably 10 to 25 (MPa$^{1/2}$), more preferably 15 to 25 (MPa$^{1/2}$), particularly preferably 15 to 20 (MPa$^{1/2}$), can provide films having good surface state uniformity and optical properties.

The above solvents can be used either solely or in a combination of two or more kinds. When the two or more solvents are used in combination, the SP value of the mixed solvent is preferably in the above-defined range. The SP value of the mixed solvent can be determined based on the SP values of the respective solvents and their respective weight ratio. For example, in a mixed solvent composed of two solvents, the SP value of the mixed solvent can be calculated by the equation: SP value=W1·SP1+W2·SP2 wherein W1 and W2 represent the weight fractions of respective solvents; and SP1 and SP2 represent the SP values of the respective solvents.

The temperature at which the copolymer of the present invention is dissolved or dispersed in the solvent, may be room temperature or an elevated temperature. A film forming solution containing the copolymer of the present invention homogeneously dissolved or dispersed therein can be prepared by thorough stirring.

Further, if necessary, colorants such as dyes and pigments may be properly added to the film forming solution, whereby a colored film can be provided.

Leveling agents may be added to the film forming solution to improve the surface smoothness of the film. Various conventional leveling agents may be used to this end. Specific examples thereof include fluorononionic surfactants, special acrylic resin leveling agents, and silicone leveling agents.

For example, metal drums, steel belts, polyester films such as polyethylene terephthalate (PET) or polyethylene naphthalate (PEN), and polytetrafluoroethylene belts may be used as carriers for the formation of a liquid layer of the film forming solution.

The film forming solution may be coated, for example, by a method using a die or a coater, a spray method, a brush coating method, a roll coating method, a spin coating method, or a dipping method.

The thickness and surface smoothness of the film can be controlled by repeatedly coating the film forming solution.

When a polyester film is used as the carrier, a surface treated film may also be used. Surface treatment methods include commonly adopted hydrophilization methods, for example, a method in which, for example, an acrylic resin or a sulfonic acid base-containing resin is coated or laminated to form a layer of these resins, or a method in which the hydrophilicity of the film surface is improved, for example, by corona discharge treatment.

When a carrier comprising concaves and convexes formed, for example, on the surface of a metal drum, a steel belt, or a polyester film by sand matting or embossing is used as the carrier, the concaves and convexes on the surface of the carrier are transferred on the film surface, whereby a film having a light diffusing function can be produced. It is a matter of course that a light diffusing function can also be imparted to the film by directly sand matting the film.

In the solvent casting method, the solvent in the liquid layer can be removed by any method without particular limitation, and a commonly adopted drying treatment method, for example, a method in which the film is passed through a drying oven by a number of rollers can be utilized. When air bubbles occur upon evaporation of the solvent in the drying step, the properties of the film are significantly deteriorated. In order to avoid this unfavorable phenomenon, preferably, the drying step is divided into plural steps of two or more stages, and, in each step, the temperature or air quantity is controlled.

The residual amount of the solvent in the film is generally not more than 10% by weight, preferably not more than 5% by weight, more preferably not more than 1% by weight, particularly preferably not more than 0.5% by weight. In this case, when the residual amount of the solvent in the film exceeds 10% by weight, upon actual use of the film, the change in dimension with the elapse of the time is disadvantageously large. Further, the residual solvent disadvantageously lowers the glass transition temperature and further deteriorates the heat resistance.

In order to suitably carry out the step of stretching which will be described later, in some cases, the residual amount of the solvent in the film should be properly regulated so as to fall within the above-defined range. Specifically, in order to develop the phase difference in the film stably and uniformly by stretch orientation treatment, in some cases, the residual amount of the solvent in the film is brought to generally 10 to 0.1% by weight, preferably 5 to 0.1% by weight, more preferably 1 to 0.1% by weight. When a very small amount of the solvent is allowed to remain in the film, in some cases, stretch orientation treatment or the control of the phase difference can be facilitated.

The thickness of the film according to the present invention is generally 0.1 to 3,000 µm, preferably 0.1 to 1,000 µm, more preferably 1 to 500 µm, most preferably 5 to 300 µm. When the thickness is below the lower limit of the above-defined range, in fact, handling of the film is difficult. On the other hand, when the thickness is above the upper limit of the above-defined range, winding in a roll form is difficult.

The distribution of the thickness of the film according to the present invention is generally within ±20%, preferably within ±10%, more preferably within ±5%, particularly preferably within ±1%, relative to the average value. The variation of the thickness per cm is generally not more than 10%, preferably not more than 5%, more preferably not more than 1%, particularly preferably not more than 0.5%. The regulation of the distribution of the thickness of the film in the above-defined range can prevent the occurrence of uneven phase difference in the stretch orientation treatment of the film.

When the film according to the present invention is subjected to stretching (stretch orientation treatment), the molecular chain of the copolymer according to the present invention for film formation is regularly oriented in a given direction to form an optical film (a retardation film) having the function of providing a phase difference to transmitted light, whereby the retardation plate according to the present invention can be provided.

The expression "regularly oriented" as used herein means that, when a conventional polymer compound (polymer) is formed into a film, for example, by melt extrusion or casting, the molecular chains of the polymer compound are in a random state without being oriented in a given direction, whereas the molecular chains of the polymer compound according to the present invention are regularly oriented monoaxially or biaxially or in the thickness-wise direction of the plane of the film, although this varies depending upon the magnitude of the distortion of the film produced during the process. The degree of regularity of the orientation of the polymer compound is various and can be regulated by stretching conditions.

Conventional monoaxial stretching or biaxial stretching may be mentioned as a specific example of the stretching method. More specific examples thereof include a transverse monoaxial stretching method by a tenter method, a roll-to-roll compression stretching method, a longitudinal monoaxial stretching method utilizing two pairs of rolls different from each other in circumference, a biaxial stretching method using a combination of transverse monoaxis with longitudinal monoaxis, and a stretching method by an inflation method.

When the monoaxial stretching method is utilized, the stretching rate is generally 1 to 5,000%/min, preferably 50 to 1,000%/min, more preferably 100 to 1,000%/min, particularly preferably 100 to 500%/min.

The biaxial stretching method may utilize a method in which stretching is carried out simultaneously in two directions that cross each other, and a method in which, after monoaxial stretching, stretching is carried out in a direction different from the initial stretching direction. In these methods, the angle at which the two stretch axes cross each other is determined depending upon desired properties and thus is not particularly limited. The angle, however, is generally in the range of 120 to 60 degrees. The stretching rate may be the same or different in each stretching direction and is generally 1 to 5,000%/min, preferably 50 to 1,000%/min, more preferably 100 to 1,000%/min, particularly preferably 100 to 500%/min.

The stretching temperature is not particularly limited but is generally Tg−5° C. to Tg+20° C., preferably Tg to Tg+10° C. wherein Tg represents the glass transition temperature of the copolymer. When the treatment temperature is in the above-defined range, the occurrence of high phase difference and uneven phase difference can be suppressed and, at the same time, the control of the refractive index ellipsoid becomes advantageously easy.

When stretching is carried out in the above-defined temperature range, any problem such as cloudiness does not occur in the retardation plate so far as the cycloolefin copolymer obtained by ring opening polymerization according to the present invention is used. This is probably because the Tg distribution of the copolymer according to the present invention is so small that heating to a temperature around Tg causes substantially uniform plastization. On the other hand, in the case of a cycloolefin copolymer obtained by ring opening polymerization, having a Tg distribution above 35° C., heating to a temperature around Tg does not cause uniform plasticization but causes a partially unplasticized state to exist, and, consequently, this part is considered to be causative of cloudiness or the like during stretching.

The stretch ratio is determined by properties such as desired phase difference and thus is not particularly limited. The stretch ratio, however, is generally 1.01 to 10 times, preferably 1.03 to 5 times, more preferably 1.03 to 3 times.

The stretched film as such may be cooled at room temperature. The following method is also preferred. Specifically, the stretched film is heat set by holding under a temperature atmosphere of about Tg−100° C. to Tg for at least 10 sec, preferably 30 sec to 60 min, more preferably one min to 60 min, and is then cooled to room temperature, whereby a retardation plate, which is less likely to cause a change in phase difference of the transmitted light with the elapse of time and has stable phase difference properties, can be provided.

In the retardation plate prepared above, since molecules are oriented by stretching, a phase difference is given to the transmitted light. This phase difference can be controlled by regulating, for example, the stretch ratio or the thickness of the film before stretching.

For example, regarding the stretch ratio, even when films have an identical thickness before stretching, there is a tendency that the absolute value of the phase difference of the transmitted light increases with increasing the stretch ratio. Accordingly, films, which can give a desired phase difference to the transmitted light, can be provided by varying the stretch ratio. Further, regarding the thickness of the film before stretching, even when the stretch ratio is identical, there is tendency that the absolute value of the phase difference given to the transmitted light increases with increasing the thickness of the film before stretching. Accordingly, retardation plates, which give a desired phase difference to transmitted light, can be provided by varying the thickness of the film before stretching.

In the retardation plate prepared above, the value of the phase difference given to the transmitted light is determined by the application of the retardation plate and this is not determined unambiguously. When the retardation plate is used in liquid crystal display elements or electroluminescent display elements or laser optical wavelength plates, the value of the phase difference given to the transmitted light is generally 1 to 10,000 nm, preferably 10 to 2,000 nm, more preferably 15 to 1,000 nm.

Preferably, the phase difference of light transmitted through the film has a high level of uniformity. Specifically, the variation at a light wavelength of 550 nm is generally not more than ±20%, preferably not more than 10%, more preferably not more than ±5%. When the variation in phase difference exceeds ±20%, unfavorable phenomena such as uneven coloring occurs upon use, for example, in liquid crystal display elements, often leading to a deterioration in performance of the display body. Likewise, the variation in optical axis is generally not more than ±2.0 degrees, preferably not more than ±1.0 degree, more preferably not more than ±0.5 degree.

The retardation plate according to the present invention may be used solely or in the form of a laminate of two or more of the retardation plates, or alternatively may be laminated onto a transparent substrate or the like. Further, in use, the retardation plate according to the present invention maybe laminated onto other film, sheet or substrate.

When the retardation plate is laminated onto a film or the like, a pressure-sensitive adhesive or an adhesive may be used. Such pressure-sensitive adhesives and adhesives preferably have excellent transparency, and specific examples thereof include pressure-sensitive adhesives such as natural rubbers, synthetic rubber, vinyl acetate/vinyl chloride copolymers, polyvinyl ethers, acrylic resins, and modified polyolefin resins, curing-type pressure-sensitive adhesives prepared by adding a curing agent such as an isocyanate group-containing compound, for example, to the above resin having a functional group such as a hydroxyl group or an amino group, polyurethane-based adhesives for dry lamination, synthetic rubber adhesives, and epoxy adhesives.

A pressure-sensitive adhesive layer or an adhesive layer may be previously laminated onto the retardation plate from the viewpoint of improving the workability of lamination onto other films, sheets, substrates and the like. In the lamination of the pressure-sensitive adhesive layer or the adhesive layer, the above pressure-sensitive adhesive or adhesive may be used.

The cycloolefin copolymer obtained by ring opening polymerization according to the present invention has excellent heat resistance and can be suitably used in overall optical applications, or alternatively may be suitably formed into films or sheets. Stretching even at a temperature around Tg does not cause any problem such as cloudiness, and, thus, stable processing can be realized. Accordingly, the cycloolefin copolymer obtained by ring opening polymerization according to the present invention is most suitable for use in applications where stretching is required, for example, optical films such as retardation plates. The film or sheet and particularly retardation plate according to the present invention may be more specifically used in various liquid crystal display elements such as portable telephones (cellular phones), digital information terminals, beepers, navigation, on-vehicle liquid crystal displays, liquid crystal monitors, light control panels, displays for office automation apparatuses, and displays for audio-video equipment, electroluminescent display elements or touch panels and the like. Further, they may also be useful as wavelength plates for use in optical disk recording/replaying devices such as CDs, CD-Rs, MDs, MOs, and DVDs.

EXAMPLES

The present invention will be described in more detail with reference to the following Examples. However, it should be noted that the present invention is not limited to these Examples. In the following Examples, "parts" or "%" is by weight unless otherwise specified.

Various properties were measured or evaluated as follows.

Glass Transition Temperature (Tg)

The glass transition temperature (Tg) was measured with DSC 6200 manufactured by Seiko Instruments Inc. at a temperature rise rate of 20° C. per min under a nitrogen atmosphere. Tg was determined by plotting the highest peak temperature (point A) of derivative differential scanning calorie and the temperature which is 20° C. below the highest peak temperature (point B) on a differential scanning calorimetry curve and determining, as the Tg value, a point of intersection between a tangential line on a baseline with the point B as a starting point and a tangential line with the point A as a starting point.

Degree of Hydrogenation $^1$H-NMR was measured with AVANCE500 manufactured by Bruker Japan Co., Ltd. as a nuclear magnetic resonance spectrometer (NMR) using d-chloroform as a solvent. The composition of the monomer was calculated based on integral values on 5.1 to 5.8 ppm of vinylene group, 3.7 ppm of methoxy group, and 0.6 to 2.8 ppm of aliphatic proton, and the degree of hydrogenation was then calculated.

Weight Average Molecular Weight

The weight average molecular weight (Mw) and molecular weight distribution (Mw/Mn) in terms of polystyrene were measured by gel permeation chromatography (GPC) with HLC-8020 manufactured by Tosoh Corporation using tetrahydrofuran (THF) as a solvent. Mn represents number average molecular weight.

Amount of Residual Solvent

A sample was dissolved in toluene, and the amount of the residual solvent was measured by gas chromatography with GC-14B manufactured by Shimadzu Corporation.

Uneven Phase Difference and Uneven Optical Axis

A film having a size of 20 cm in length, 20 cm in width, and 130 μm in thickness was stretched by a factor of 1.5 longitudinally by a free end monoaxial stretching method at a stretching temperature of Tg of copolymer+5° C. and at a rate of 300%/min. After stretching, the film was cut out from the center part of the film into a size of 26 cm in length and 12 cm in width (312 cm$^2$), and the phase difference and the optical axis were measured with an optical birefringence analyzer KOBRA-21ADH manufactured by Oji Scientific Instruments at intervals of 2 cm in length and at intervals of 2 cm in width.

Example 1

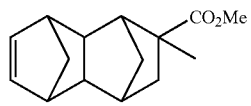

70 parts of 8-methyl-8-methoxycarbonyl-tetracyclo[4.4.0.1$^{2,5}$.1$^{7,10}$]-3-dodecene (DNM) represented by the above formula, 20 parts of dicyclopentadiene(DCP), 7 parts of 1-hexene as a molecular weight modifier, and 200 parts of toluene were charged into a reaction vessel in which the air was replaced by nitrogen, and the mixture was heated to 100° C. 0.005 part of triethylaluminum and 0.005 part of methanol-modified WCl$_6$ (anhydrous methanol:PhPOCl$_2$:WCl$_6$ weight ratio=103:630:427) were added thereto, and a reaction was allowed to proceed for one min. Next, 10 parts of DCP was additionally added over a period of 5 min, and a reaction was allowed to proceed for additional 45 min to give a polymer.

The polymer solution thus obtained was placed in an autoclave, and 200 parts of toluene was added. Next, 1 part of octadecyl-3-(3,5-di-t-butyl-4-hydroxyphenyl)propionate as a reaction regulator and 0.006 part of RuHCl(CO) [P(C$_6$H$_5$)]$_3$ as a hydrogenation catalyst were added thereto, and the mixture was heated to 155° C. Hydrogen gas was then introduced into the reaction vessel, and the pressure was brought to 10 MPa. Thereafter, a reaction was allowed to proceed at 165° C. for 3 hr while maintaining the pressure at 10 MPa. After the completion of the reaction, the reaction mixture was poured into a large amount of a methanol solution for precipitation to give a hydrogenation product. The hydrogenation product thus obtained was purified by reprecipitation from toluene and methanol to give a copolymer (1).

The copolymer (1) had weight average molecular weight (Mw)=11.2×10$^4$, molecular weight distribution (Mw/Mn)=3.3, intrinsic viscosity ($\eta_{inh}$)=0.78, and glass transition temperature (Tg)=143° C. The Tg distribution was 25° C. The chart obtained by DSC measurement is shown in FIG. 1. The degree of hydrogenation of the copolymer (1) was determined by $^1$H-NMR measurement. As a result, it was found that not less than 99.9% of the olefinic unsaturated bond was hydrogenated.

The copolymer (1) was dissolved in methylene chloride to prepare a solution having a concentration of 30%, and the solution was cast on a smooth glass plate to give a 130 μm-thick cast film (1). The residual solvent amount of the cast film (1) thus obtained was not more than 0.5%. Thereafter, the cast film (1) was stretched by a factor of 1.5 by a free end monoaxial stretching method at 148° C. (Tg of copolymer (1)+5° C.) and at stretch ratio=300%/min to give a stretched film (1).

It could be confirmed that the stretched film (1) had thickness=85 μm, phase difference=343 μm, birefringent index=0.00404, and haze value=0.1 and was transparent and free from defects in appearance. The area satisfying a phase difference of ±3 nm and an optical axis of not more than ±0.5 degree after stretching was 64 cm$^2$.

The copolymerization reactivity between DCP and DNM was determined by the Fineman-Ross method. As a result, it was found that the copolymerization reactivity ratio between DCP (r$_1$) and DNM (r$_2$) was r$_1$/r$_2$=1.716/0.940. r$_1$/r$_2$ for conversion 1%=0.789, and r$_1$/r$_2$ for conversion 95%=0.336, and the difference in r$_1$/r$_2$ between conversion 95% and conversion 1% was 0.453.

Example 2

A copolymer (2) was prepared in the same manner as in Example 1, except that DCP was not used, the whole amount (86 parts) of DNM was charged into the reaction vessel, the polymerization was then initiated, and, after the initiation of the polymerization, 14 parts of norbornene (NB) was added succesively over a period of 20 min.

Figure 2:
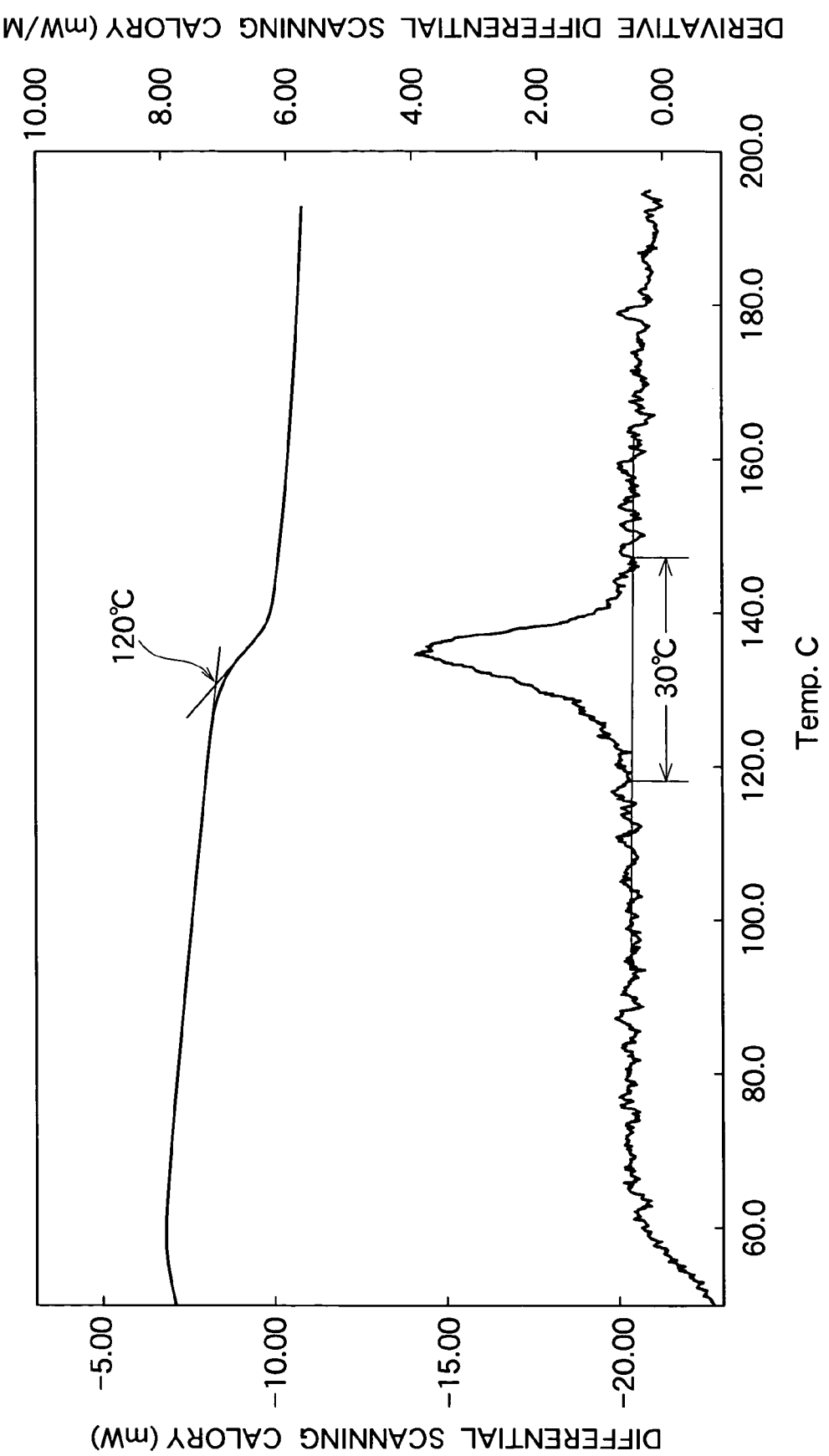
FIG. 2 is a DSC measurement chart of copolymer (2) produced in Example 2.

The copolymer (2) had weight average molecular weight (Mw)=9.3×10$^4$, molecular weight distribution (Mw/Mn)=3.0, intrinsic viscosity ($\eta_{inh}$)=0.62, and glass transition temperature (Tg)=120° C. The Tg distribution was 30° C. The chart obtained by DSC measurement is shown in FIG. 2. The degree of hydrogenation of the copolymer (2) was determined by ¹H-NMR measurement. As a result, it was found that not less than 99.9% of the olefinic unsaturated bond was hydrogenated.

A 130 μm-thick cast film (2) was prepared in the same manner as in Example 1. The residual solvent amount of the cast film (2) was not more than 0.5%. The cast film (2) was stretched by a factor of 2.0 at a temperature of 125° C. (Tg of copolymer (2)+5° C.) to give a stretched film (2).

It could be confirmed that the stretched film (2) had thickness=85 μm, phase difference=344 μm, birefringent index=0.00405, and haze value=0.1 and was transparent and free from defects in appearance. The area satisfying a phase difference of ±3 nm and an optical axis of not more than ±0.5 degree after stretching was 60 cm².

The copolymerization reactivity between NB and DNM was determined by the Fineman-Ross method. As a result, it was found that the copolymerization reactivity ratio between NB ($r_1$) and DNM ($r_2$) was $r_1/r_2$=5.081/0.546. $r_1/r_2$ for conversion 1%=1.289, and $r_1/r_2$ for conversion 95%=0.027, and the difference in $r_1/r_2$ between conversion 95% and conversion 1% was 1.262.

Comparative Example 1

A copolymer (3) was produced in the same manner as in Example 1, except that 50 parts of DCP and 50 parts of DNM were used and the whole amount of them was charged into the reaction vessel followed by initiation of the polymerization.

Figure 3:
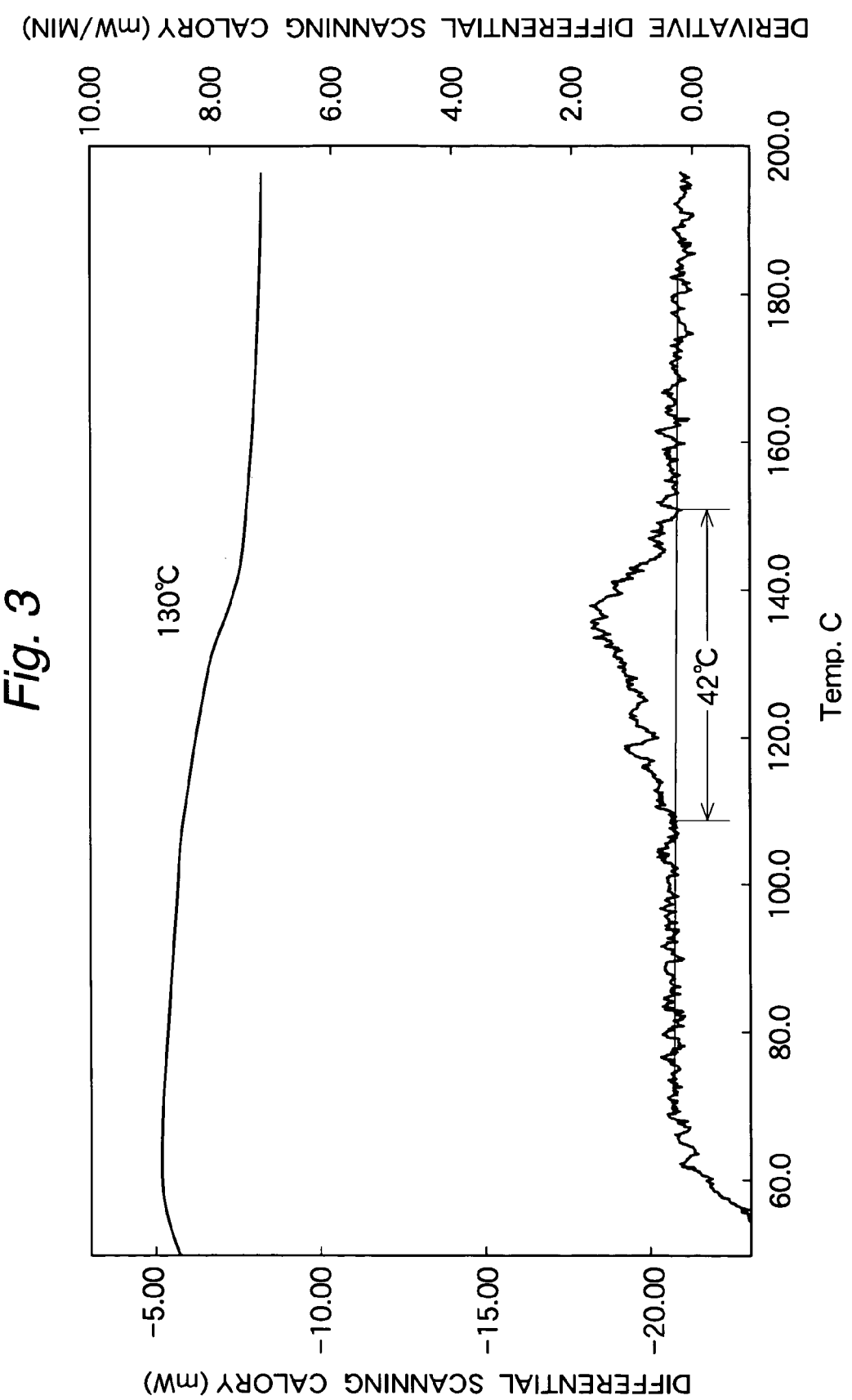
FIG. 3 is a DSC measurement chart of copolymer (3) produced in Comparative Example 1.

The copolymer (3) had weight average molecular weight (Mw)=13.3×10⁴, molecular weight distribution (Mw/Mn)=4.0, intrinsic viscosity ($\eta_{inh}$)=0.74, and glass transition temperature (Tg)=130° C. The Tg distribution was 42° C. The chart obtained by DSC measurement is shown in FIG. 3. The degree of hydrogenation of the copolymer (3) was determined by ¹H-NMR measurement. As a result, it was found that not less than 99.9% of the olefinic unsaturated bond was hydrogenated.

A 130 μm-thick cast film (3) was prepared in the same manner as in Example 1. The residual solvent amount of the cast film (3) was not more than 0.5%. The cast film (3) was then stretched by a factor of 1.5 at a temperature of 135° C. (Tg of copolymer (3)+5° C.) to give a stretched film (3-1).

The stretched film (3-1) had thickness=85 μm, phase difference=343 nm, birefringent index=0.00401, and haze value=1.8 and had poor transparency. The area satisfying a phase difference of ±3 nm and an optical axis of not more than ±0.5 degree after stretching was 32 cm², indicating that the area having uniform phase difference and free from uneven optical axis was very small.

The cast film (3) was stretched by a factor of 1.5 at a temperature of 155° C. (Tg of copolymer (3)+25° C.) to give a stretched film (3-2). The stretched film (3-2) had thickness=85 μm, phase difference=163 nm, birefringent index=0.00192, and haze value=0.4. The area satisfying a phase difference of ±3 nm and an optical axis of not more than ±0.5 degree after stretching was 64 cm². Although the transparency and the area having uniform phase difference and free from uneven optical axis were improved, the phase difference developability was significantly lowered due to lowered birefringent index.

$r_1/r_2$ for conversion 1%=2.636, and $r_1/r_2$ for conversion 95%=0.866, and the difference in $r_1/r_2$ between conversion 95% and conversion 1% was 1.770.

Comparative Example 2

A copolymer (4) was produced in the same manner as in Example 2, except that the whole amount of DNM and norbornene was charged into the reaction vessel followed by initiation of the polymerization.

Figure 4:
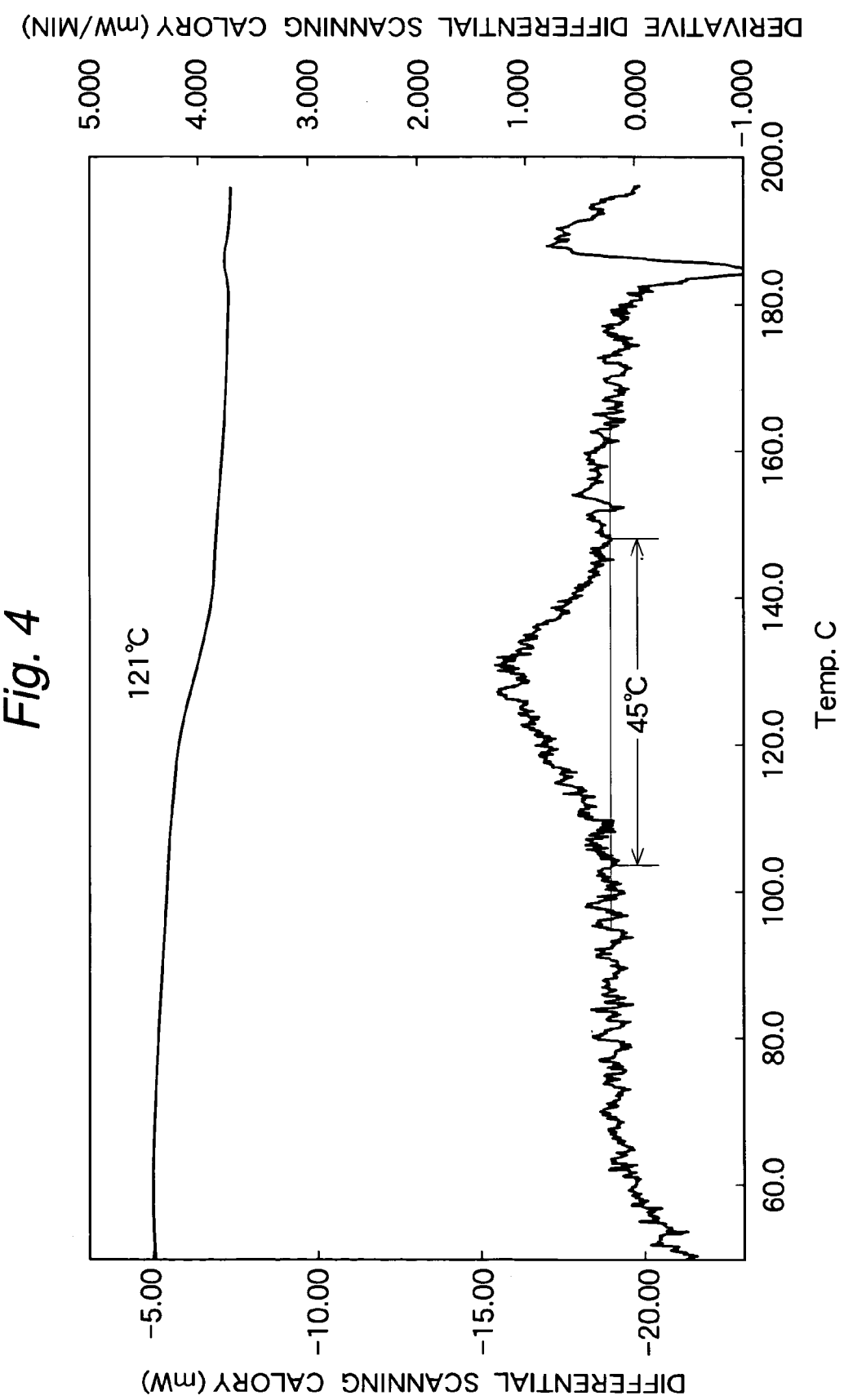
FIG. 4 is a DSC measurement chart of copolymer (4) produced in Comparative Example 2.

The copolymer (4) had weight average molecular weight (Mw)=10.3×10⁴, molecular weight distribution (Mw/Mn)=3.5, intrinsic viscosity ($\eta_{inh}$)=0.64, and glass transition temperature (Tg)=121° C. The Tg distribution was 45° C. The chart obtained by DSC measurement is shown in FIG. 4. The degree of hydrogenation of the copolymer (4) was determined by ¹H-NMR measurement. As a result, it was found that not less than 99.9% of the olefinic unsaturated bond was hydrogenated.

A 130 μm-thick cast film (4) was prepared in the same manner as in Example 1. The residual solvent amount of the cast film (4) was not more than 0.5%. The cast film (4) was then stretched by a factor of 1.5 at a temperature of 126° C. (Tg of copolymer (4) +5° C.) to give a stretched film (4-1).

The stretched film (4-1) had thickness=85 μm, phase difference=325 nm, birefringent index=0.00387, and haze value=4.3 and had poor transparency. The area satisfying a phase difference of ±3 nm and an optical axis of not more than ±0.5 degree after stretching was 24 cm², indicating that the area having uniform phase difference and free from uneven optical axis was very small.

The cast film (4) was stretched by a factor of 1.5 at a temperature of 146° C. (Tg of copolymer (3)+25° C.) to give a stretched film (4-2).

The stretched film (4-2) had thickness=85 μm, phase difference=102 nm, birefringent index=0.00109, and haze value=0.8. The area satisfying a phase difference of ±3 nm and an optical axis of not more than ±0.5 degree after stretching was 56 cm². Although the transparency and the area having uniform phase difference and free from uneven optical axis were improved, the phase difference developability was significantly lowered due to lowered birefringent index.

The invention claimed is:

1. A cycloolefin copolymer obtained by ring opening polymerization, comprising a structural unit represented by general formula (1) and exhibiting a single peak in a derivative differential scanning calorimetry curve obtained by differential scanning calorimeter (DSC), having a temperature width of the rising part in the peak of 35° C. or below, and having a glass transition temperature (Tg) of 110° C. or above, wherein the cycloolefin copolymer comprises a copolymer of 8-methyl-8-methoxycarbonyltetracyclo[4.4.0.1$^{2,5}$.1$^{7,10}$]-3-dodecene with tricyclo[4.3.0.1$^{2,5}$]deca-3,7-diene:

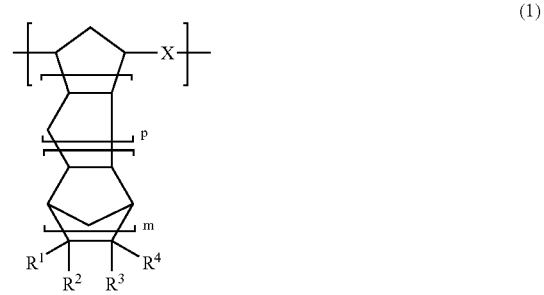

(1)

wherein m is 0 (zero), 1 or 2, p is 0 (zero) or 1, X independently represents a group represented by formula: —CH=CH— or a group represented by formula:

—$CH_2CH_2$—, $R^1$ to $R^4$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group, and $R^1$ and $R^2$, or $R^3$ and $R^4$ together may combine to form a mono- or polycyclic carbocyclic or heterocyclic ring.

2. The cycloolefin copolymer obtained by ring opening polymerization according to claim 1, comprising two or more kinds of structural units represented by general formula (1).

3. The cycloolefin copolymer obtained by ring opening polymerization according to claim 2, wherein any structural unit other than the structural unit represented by general formula (1) is absent.

4. A film or sheet comprising the cycloolefin copolymer obtained by ring opening polymerization according to claim 1.

5. A retardation plate comprising the film or sheet according to claim 4 which has been subjected to stretch orientation.

6. A process for producing a retardation plate, comprising subjecting the film or sheet according to claim 4 to stretch orientation under temperature conditions of Tg of the cycloolefin copolymer contained in the film or sheet to (Tg+10)° C.

7. A retardation plate comprising a film or sheet which has been subjected to stretch orientation; the film or sheet comprising a cycloolefin copolymer obtained by ring opening polymerization; and the cycloolefin copolymer obtained by ring opening polymerization comprising a structural unit represented by general formula (1) and exhibiting a single peak in a derivative differential scanning calorimetry curve obtained by differential scanning calorimeter (DSC), having a temperature width of the rising part in the peak of 35° C. or below, and having a glass transition temperature (Tg) of 110° C. or above:

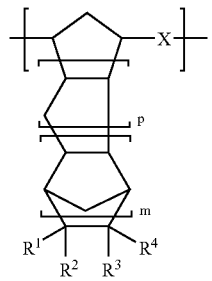

(1)

wherein m is 0 (zero), 1 or 2, p is 0 (zero) or 1, X independently represents a group represented by formula: —CH═CH— or a group represented by formula: —$CH_2CH_2$—, $R^1$ to $R^4$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group, and $R^1$ and $R^2$, or $R^3$ and $R^4$ together may combine to form a mono- or polycyclic carbocyclic or heterocyclic ring.

8. A process for producing a retardation plate, comprising subjecting a film or sheet to stretch orientation under temperature conditions of Tg of a cycloolefin copolymer comprised in the film or sheet to (Tg+10)° C.; the film or sheet comprising the cycloolefin copolymer which is obtained by ring opening polymerization; and the cycloolefin copolymer obtained by ring opening polymerization comprising a structural unit represented by general formula (1) and exhibiting a single peak in a derivative differential scanning calorimetry curve obtained by differential scanning calorimeter (DSC), having a temperature width of the rising part in the peak of 35° C. or below, and having a glass transition temperature (Tg) of 110° C. or above:

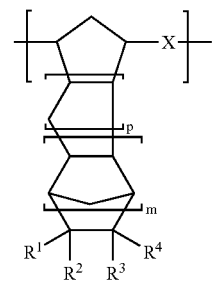

(1)

wherein m is 0 (zero), 1 or 2, p is 0 (zero) or 1, X independently represents a group represented by formula: —CH═CH— or a group represented by formula: —$CH_2CH_2$—, $R^1$ to $R^4$ each independently represent a hydrogen atom; a halogen atom; a substituted or unsubstituted hydrocarbon group having 1 to 30 carbon atoms and optionally having a linking group containing oxygen, nitrogen, sulfur, or silicon; or a polar group, and $R^1$ and $R^2$, or $R^3$ and $R^4$ together may combine to form a mono- or polycyclic carbocyclic or heterocyclic ring.

* * * * *